United States Patent

Kaku et al.

Patent Number: 6,002,724
Date of Patent: Dec. 14, 1999

[54] TRANSMISSION APPARATUS AND CONTROL METHOD THEREFOR

[75] Inventors: Takashi Kaku; Takeshi Asahina; Toyomi Obikawa; Ryoji Okita, all of Kawasaki, Japan

[73] Assignee: Fujitsu Limited, Kanagawa, Japan

[21] Appl. No.: 08/748,346

[22] Filed: Nov. 14, 1996

[30] Foreign Application Priority Data

Feb. 19, 1996 [JP] Japan ................................. 8-030627

[51] Int. Cl.[6] .............................. H03H 7/30; H04B 1/38; H04B 1/06
[52] U.S. Cl. .......................... 375/326; 375/222; 455/255
[58] Field of Search .................................. 375/326, 357, 375/222; 455/255, 257, 258, 259; 331/1 R

[56] References Cited

U.S. PATENT DOCUMENTS

| | | | |
|---|---|---|---|
| 4,953,210 | 8/1990 | McGlynn et al. | 375/222 |
| 5,025,469 | 6/1991 | Bingham | 375/222 |
| 5,461,266 | 10/1995 | Koreeda et al. | 307/125 |
| 5,637,932 | 6/1997 | Koreeda et al. | 307/125 |
| 5,727,020 | 3/1998 | Taylor et al. | 375/222 |

*Primary Examiner*—Chi H. Pham
*Assistant Examiner*—Khai Tran
*Attorney, Agent, or Firm*—Helfgott & Karas, P.C.

[57] ABSTRACT

A transmission apparatus such as a modem has a receiving unit which receives information and a clock-supplying unit which supplies a clock signal to the receiving unit. It further has an instantaneous dropout detection unit which detects the occurrence of an instantaneous dropout on the receiving circuit and a clock supply control unit which stops the supply of a clock to the receiving unit for a prescribed amount of time when the instantaneous dropout detection unit detects an instantaneous dropout, the stopping of the clock supply causing holding of receiving parameters and the restarting of clock supply causing restarting of the receiving operation.

3 Claims, 5 Drawing Sheets

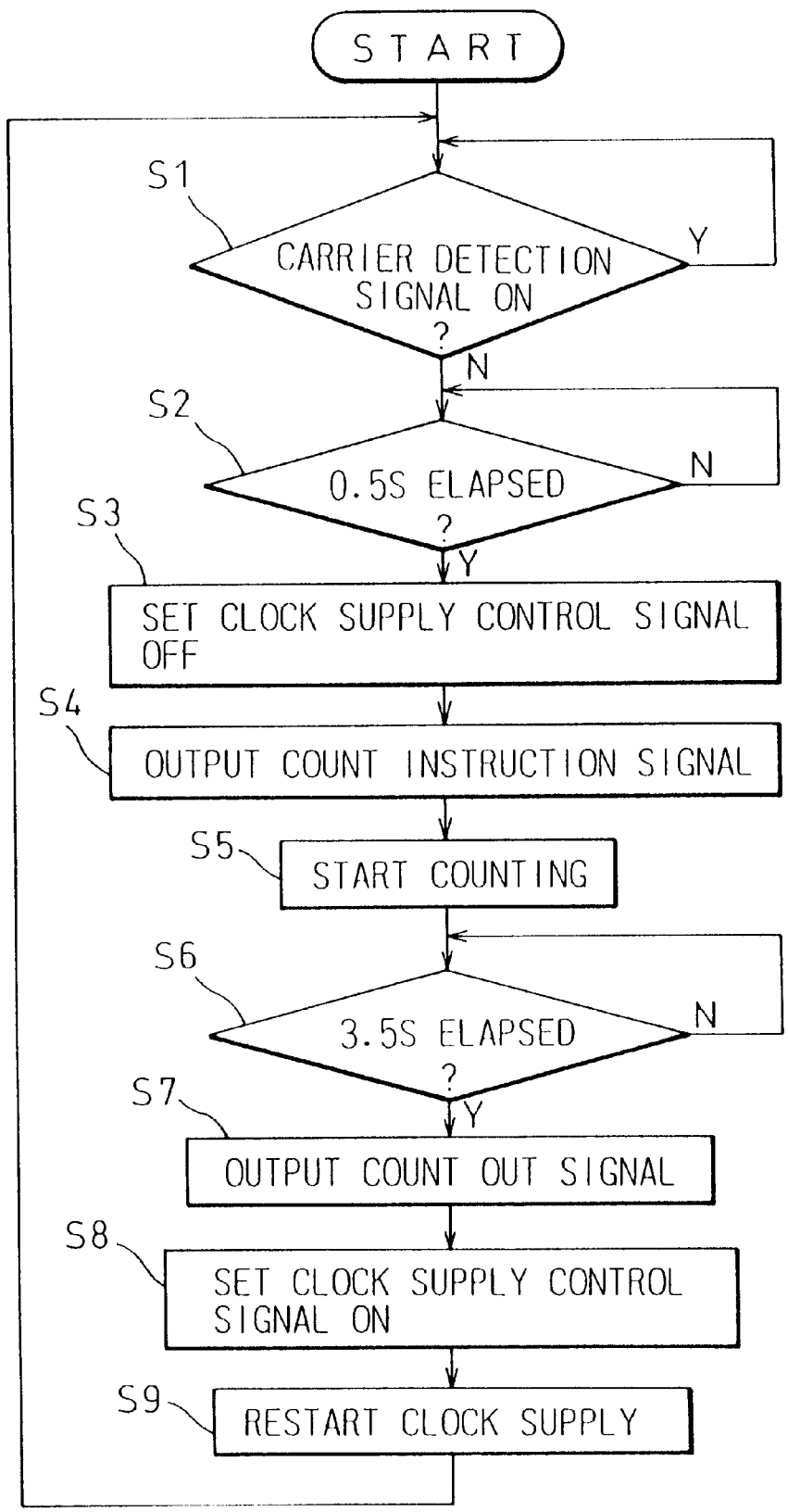

TRANSMISSION APPARATUS AND CONTROL METHOD THEREFOR

BACKGROUND OF THE INVENTION

1. Field of the Invention

The present invention relates to a transmission apparatus such as a modulator-demodulator (modem).

A modem has been used in the past by connecting it to an analog circuit and using it to perform data transfer. In this case, while instantaneous dropouts of the circuit can occur, depending upon the condition of the circuit, it is necessary to have a means of preventing such instantaneous circuit dropouts from disturbing the data transfer.

2. Description of Related Art

In a modem in the past, before starting data communication, a training signal is sent and received between a modem and the modem on the other end to perform synchronization lock-in processing which establishes synchronization therebetween. By performing synchronization lock-in processing, the modem is set to a condition which is optimized for the condition of the circuit, enabling normal reception of data. After completion of the synchronization lock-in processing, data communication is started. In the above-noted synchronization lock-in processing, automatic equalizer tap coefficients, AGC circuit coefficients, and the like within the modem are set in response to the condition of the circuit over which the signal is transferred.

There are cases in which the data being communicated is interrupted by what is known as an instantaneous dropout. This instantaneous dropout can occur by a physical breaking of the communication line, by manual twisting of a communication line the covering of which has become deteriorated, and by a poor connection caused by externally applied vibration, temperature variation, or the like. A judgment with regard to the occurrence of this instantaneous dropout can be known in the case of a modem by whether or not a carrier signal is being sent from the modem of the other party.

As methods for handling an instantaneous dropout, a first method is that in which synchronization lock-in is started again immediately after the detection of recovery from the instantaneous dropout, and second method being the recognition of the instantaneous dropout, and the holding of the modulation-demodulation section of the modem in the condition that it was in immediate prior to the instantaneous dropout. Specifically, the values of the settings of each part of the modem which were set by synchronization lock-in are saved in a memory. These values include, for example, automatic equalizer tap coefficients and AGC circuit coefficients. When the carrier signal is detected once again and it is judged that recovery has been made from the instantaneous dropout, the setting values which had been stored in the memory are re-set into the various parts of the modem, and data reception operation is restarted under the conditions which were in effect immediately prior to the occurrence of the instantaneous dropout. In this manner, by temporarily saving the setting value of each part and re-setting these values at the point at which recovery from the instantaneous dropout is achieved, it is possible to restore data communication quickly without having to reperform synchronization lock-in after recovery from the instantaneous dropout.

However, in the above-described methods of the past, the following problems exist.

Because telephones lines in the past were generally analog lines and the modems were also designed as analog modems to suit these lines, instantaneous dropouts occurring thereon were mostly within 1 second, so that it was sufficient for a modem to be able to tolerate an instantaneous dropout of this length. However, with the digitization of telephone lines in recent years, the mode of occurrence of instantaneous dropouts has changed, and because of the framing of data to be transferred on digital lines, instantaneous dropouts of a length from 1 to 4 seconds, caused by loss of frame synchronization often occur.

In addition, in a modem for the analog lines of the past, because the modem was designed for a recovery from an instantaneous dropout of approximately 1 second, if an instantaneous dropout occurs over a period of greater than 1 second, synchronization lock-in will be started once again with respect to the other modem, so that in the first method even if the synchronization lock-in is redone from the beginning a training period of approximately several seconds was sufficient. With the appearance of high-speed modems in recent years, however, the training period is greatly lengthened, so that in the case in which the synchronization lock-in processing is performed once again, up to approximately 20 seconds is required from the time of the occurrence of the instantaneous dropout to the re-establishment of communication. However, a problem occurred in that, when approximately 20 seconds have elapsed from the time of the occurrence of an instantaneous dropout, the network times out, resulting in the network itself going down. In this case, because data communication itself is terminated, it was not possible to quickly restart data communication.

The modulation-demodulation sections of modems in recent years have been implemented by LSI devices, with the settings of the functions thereof fixed, making it extremely difficult to add new functions to or change the functions of such LSI-implemented modulation-demodulation sections. For this reason, in the case of a modem of the past which does not accommodate the above-noted instantaneous dropout countermeasures, if an instantaneous dropout occurred the apparatus would be temporarily reset regardless of the length thereof, making it necessary to perform synchronization lock-in once again.

In the case of the above-described second method as well, it was necessary to provide a memory for the saving of a variety of parameters and the like, resulting in an increase in the scale of the hardware and manufacturing cost, in addition to the problem of a limitation in memory resources in the case of the above-noted LSI-implemented modem. In addition, a problem existed in that the sequential control for the purpose of the processing of saving into memory was complex and difficult.

SUMMARY OF THE INVENTION

In consideration of the above-noted problems, an object of the present invention is to implement a transmission apparatus which enables quick recovery of data communication when recovering from an instantaneous dropout and, in particular, to improve the immunity to instantaneous dropouts without having to making major changes to the transmission apparatus.

For the purpose of achieving the above-noted object, in the present invention, the existence of the carrier signal sent from the other party's modem via the communication circuit is detected, and when the carrier signal has been interrupted stopping/restart control of the supply of a control signal to the transmitting/receiving section is performed.

According to the present invention a transmission apparatus having a receiving means for receiving information and a clock-supplying means for supplying a clock signal to the receiving means is provided, this transmission apparatus further having an instantaneous dropout detection means for detecting the occurrence of an instantaneous dropout on a circuit, and a clock supply control means for stopping the supply of a clock signal to the above-noted receiving means when an instantaneous dropout is detected by the instantaneous dropout detection means.

By stopping the supply of a clock signal to the transmitting/receiving section, it is possible to hold the transmitting/receiving section in the condition it was immediately before the supply of the clock signal was stopped. For this reason, various setting values are also maintained in the condition they were immediately before the supply of the clock signal was stopped. Therefore, by stopping the supply of the clock signal to the transmitting/receiving section at the point at which an instantaneous dropout occurs, it is possible to hold the condition of setting values immediately prior to the instantaneous dropout without, for example, saving them in memory. It is then possible after recovery is made from the instantaneous dropout to restart the supply of the clock to the transmitting/receiving section, thereby enabling quick restarting of the operation of the transmitting/receiving section. Because the various setting values immediately before the instantaneous dropout are held, it is possible to restart communication quickly in a condition which is close to the condition of the circuit at the time of the instantaneous dropout, even without reperforming synchronization lock-in after recovery from the instantaneous dropout.

In addition, the above-noted instantaneous dropout detection means detects the existence or non-existence of the carrier signal sent from the transmission apparatus of the other party via the circuit and, in response to this detection, outputs a carrier detection signal to the above-noted clock supply control means. By doing this, the clock supply control means outputs a clock supply control signal, which controls the supply of the clock signal to the transmitting/receiving section, in response to the carrier detection signal. In addition, after a prescribed amount of time after the occurrence of an instantaneous dropout, a clock supply control means according to the present invention outputs a transmitting/receiving section clock supply restart instruction signal to the clock-supplying means.

Because the operation of the transmitting/receiving section is stopped during the period of time during which the clock supply is stopped, it is not possible to detect the carrier during this period. If an amount of time has elapsed during which it is expected that a recovery was made from the instantaneous dropout, by means of the above-noted clock supply restart instruction signal, the supply of the clock signal to the transmitting/receiving section is restarted regardless of the existence or non-existence of the carrier signal. If the carrier signal is then received, the communication of information is resumed as is.

Additionally, the clock supply control means according to the present invention has a gating means to which are input a clock signal which is output by a clock source and the clock supply control signal, and which outputs the clock signal in response to the states of those signals.

BRIEF DESCRIPTION OF THE DRAWINGS

The present invention will be more clearly understood from the description as set forth below, with reference being made to the accompanying drawings, wherein:

FIG. 5 is a flowchart which shows the procedure of instantaneous dropout countermeasures according to one embodiment of the present invention.

DESCRIPTION OF PREFERRED EMBODIMENTS

Figure 1:
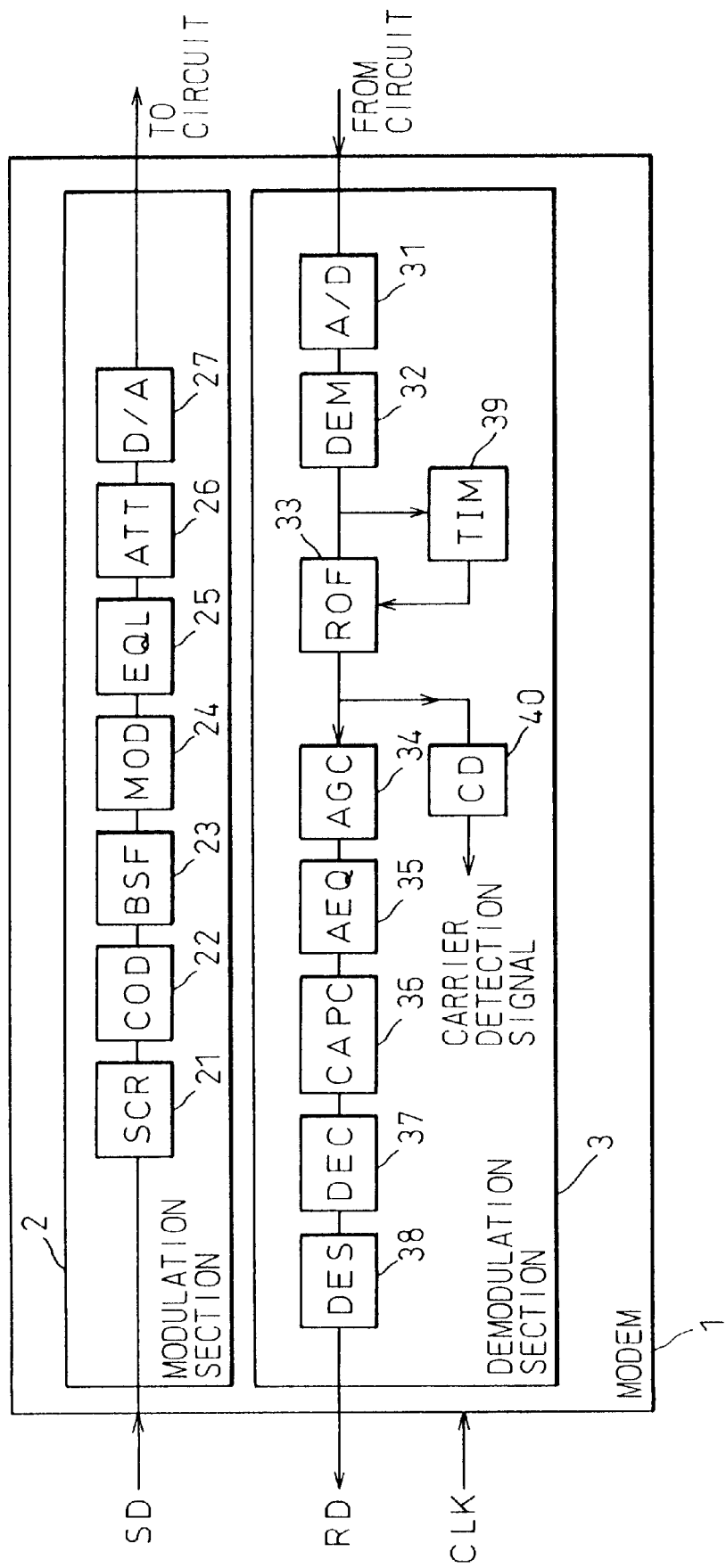
FIG. 1 is a drawing which shows the configuration of a modem to which the present invention is applied.

FIG. 1 is a block diagram which shows the configuration of a modem according to an embodiment of the present invention, and which shows in particular the configuration of the modulation-demodulation section.

In FIG. 1, the reference numeral 1 denotes a modulation-demodulation section, 2 is a modulation section which modulates a transmitted signal, and 3 is a demodulation section which demodulates a received signal.

In the modulation section, 21 is a scrambler (SCR), which randomizes the transmitted data SD by scrambling it, and 22 is a code converter (COD) which performs desired code conversion of the output signal from the scrambler 2.

In the same drawing, 23 is a transmitting baseband filter (BSF) which passes the baseband component of the digital signal which is output from the code converter, and 24 is a modulation section (MOD), which modulates the output signal from the baseband filter 23 with a prescribed frequency.

In the same drawing, 25 is a fixed equalizer (EQL), which equalizes the modulated signal which is output from the modulation section 24, and 26 is an attenuator (ATT), which limits the level of the signal which is output from the fixed equalizer 25.

The output signal from the attenuator 26 is converted to an analog signal by a digital/analog converter (D/A) 27, this being sent to the other station via the circuit.

In the demodulation section 3, the reference numeral 31 denotes an analog/digital converter (A/D), which converts the analog signal received from the circuit to a digital signal, and 32 is a demodulation section (DEM), which demodulates the digital signal resulting from the conversion by the A/D converter 31 to the prescribed demodulation frequency. The reference numeral 33 denotes a roll-off filter (ROF), which is a band-separation filter, this filter passing only frequencies in the demodulated signal within a prescribed range of frequencies. This roll-off filter 33 can be implemented as, for example, a transversal filter.

The reference numeral 34 denotes an automatic gain control section (AGC), which is provided for the purpose of automatically adjusting the signal level of the signal which is band-limited by the roll-off filter 33 to a prescribed value, 35 is an automatic equalizer (AEQ), which performs equalizations to the demodulated signal for the purpose of correcting transmission distortion and the like which occurs because of the condition of the circuit, and 36 is a carrier phase compensation section (CAPC) which compensates for the phase of the signal which is output from the automatic equalizer 35.

The reference numeral 37 denotes a decoding section (DEC), which decodes the encoded signal which is output from the carrier phase compensation section, and 38 is a descrambler (DES), which restores the demodulated signal which has been scrambled at the transmitting side to its original form.

The reference numeral 39 denotes a timing generation section (TIM), which extracts the timing component from the received signal which is demodulated by means of the demodulation section 32. The timing component which is extracted by the timing generation section 39 is supplied to, for example, the roll-off filter 33.

The reference numeral 40 denotes carrier detection section (CD), which detects whether or not data is being received by receiving the carrier signal.

The modulation-demodulation section 1 is supplied with a common clock signal (CLK), and operates in accordance with this supplied clock signal.

Figure 2:
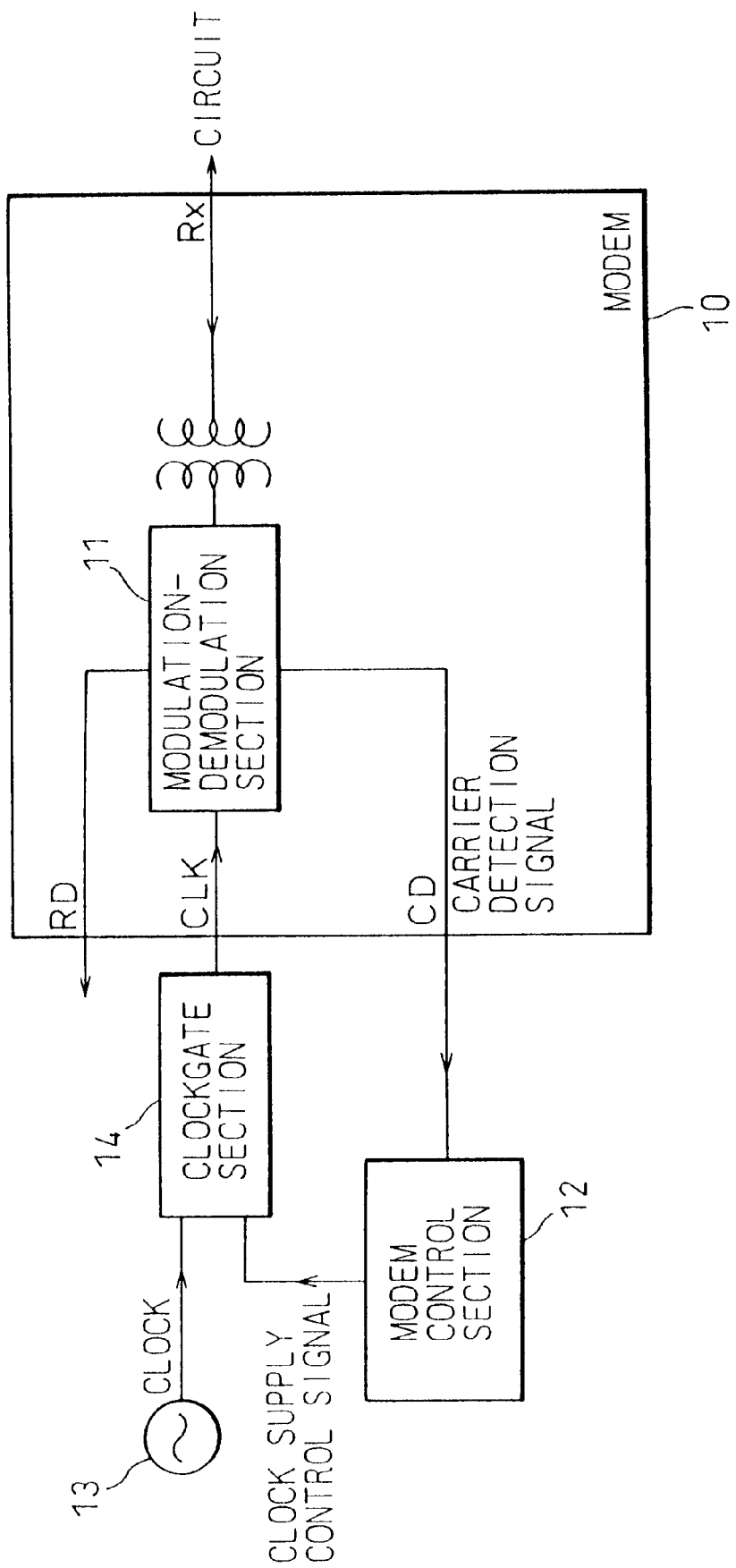
FIG. 2 is a drawing which illustrates the principle of the present invention.

FIG. 2 is a drawing which shows the principle of the present invention and illustrates the configuration of a modem which performs instantaneous dropout countermeasures according to the present invention.

Figure 3:
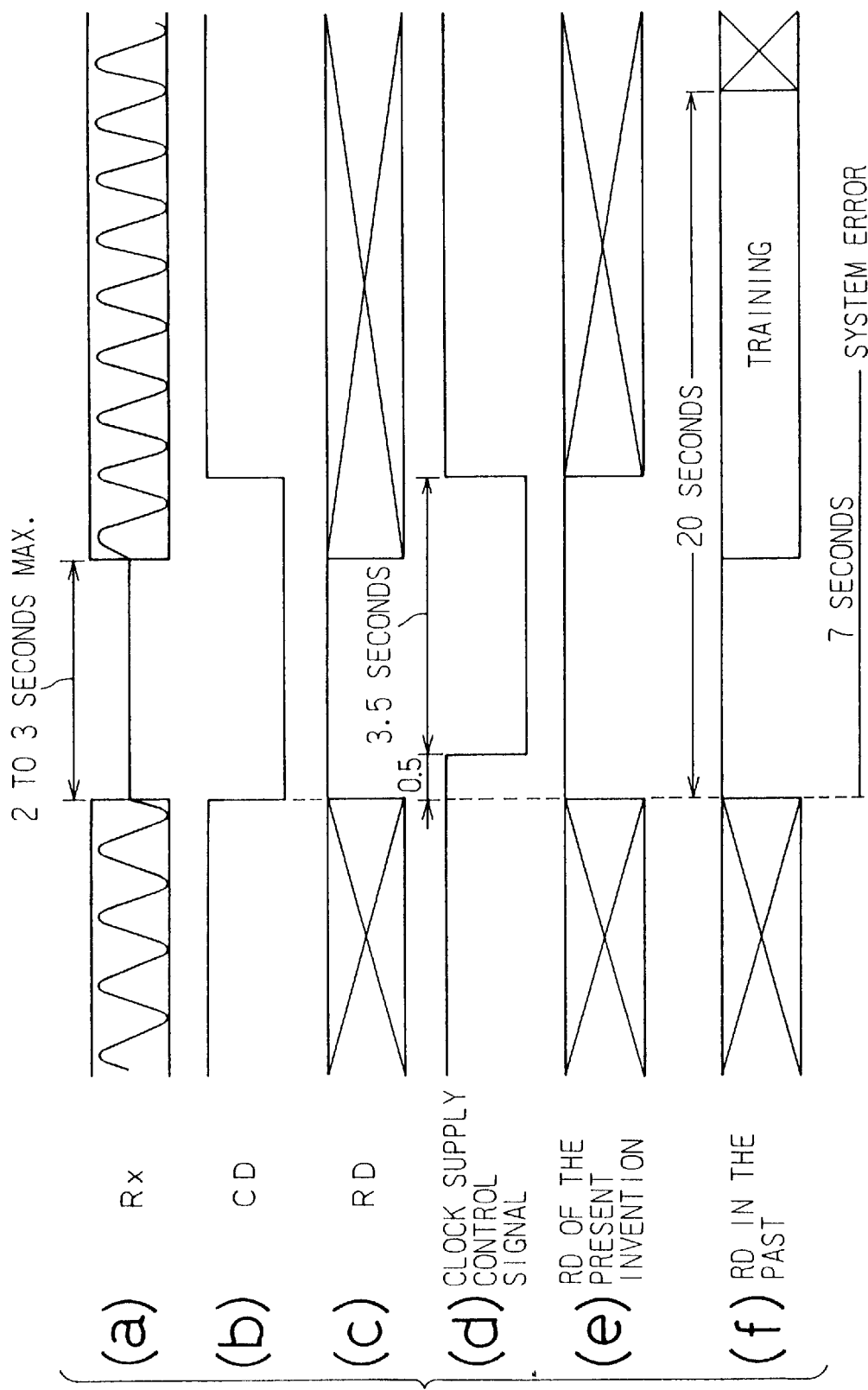
FIG. 3 is a timing diagram of the operation of instantaneous dropout protection in the present invention.

FIG. 3 is a timing diagram which shows the instantaneous dropout protection operation according to the present invention.

In FIG. 2, the reference numeral 10 denotes a modem, 11 is a modulation-demodulation section, 12 is a modem control section, 13 is a clock source, and 14 is a gate section. The modem 10 and modulation-demodulation section 11 correspond respectively to the modem 1 and the modulation section 2 and demodulation section 3 of FIG. 1.

In the case of normal data transfer, a carrier signal is sent from the modem of the other party via the circuit. When this occurs, the carrier detection section 40 of FIG. 1 detects the carrier signal, and outputs a carrier detection signal to the modem control section 12.

The modem control section 12 outputs a clock supply control signal to the gate section 14 during the time period in which the carrier detection signal is being output from the modulation-demodulation section. This clock supply control signal is, for example, a high-level signal.

The clock signal itself is constantly output from the clock source 13. During the time period during which the clock supply control signal is output from the modem control section 12, the clock signal is supplied to the modulation-demodulation section 11.

Next, the case in which the carrier signal is interrupted by an instantaneous dropout will be explained with reference to FIG. 3.

In this case, as shown at FIGS. 3(*a*) and (*b*), when an instantaneous dropout occurs in the received signal, because the carrier detection section 40 of FIG. 1 cannot detect the carrier signal, the carrier detection signal (CD) is no longer output (that is, becomes low level). As shown at FIG. 3(*d*), when the supply of the carrier detection signal stops, the modulation-demodulation section 12 outputs the clock supply control signal so that the supply of the clock signal to the modulation-demodulation section 11 stops. Also, a timer is provided in the modem control section 12, this timer being started when the supply of the carrier detection signal stops, the clock supply control signal, which stops the carrier supply, being supplied to the gate section 14 at the instant at which the timer running time has reached a prescribed amount of time, for example 0.5 second or longer. In this example, the above-noted clock supply control signal is a low-level signal. By virtue of the above-noted operation of the modem control section 12, when 0.5 seconds elapses from the time at which the carrier signal is interrupted, the supply of the clock signal with respect to the modulation-demodulation section 11 is stopped.

In this case, by stopping the supply of the clock signal, the operation of the modulation-demodulation section 11 stops, the condition of which is held as the condition in effect before the clock signal supply was stopped. For this reason, the automatic equalizer, the AGC circuit, and the CAPC circuit coefficients and the like which were set by performing training when connection was made to the circuit are also held unchanged.

Even after the supply of the carrier signal stops, the modem control section 12 continues to monitor the timer, and at a point at which, for example, 3.5 seconds elapses after the stopping of the supply of the clock signal (4 seconds after the carrier is no longer detected), the modem control section 12 restores the clock supply control signal ((*d*) in FIG. 3). By doing this, the supply of the clock signal to the modulation-demodulation section 11 is restarted, causing the operation of the modulation-demodulation section 11 to be restarted.

In general, three-fourths of instantaneous dropouts are shorter than 2 to 3 seconds, and an instantaneous dropout of less than 1 second occurs once in five days. Therefore, even if a digital circuit is used, approximately 4 seconds after the occurrence of an instantaneous dropout the possibility of recovery is extremely high. For this reason, in this embodiment, after 4 seconds have elapsed after the carrier is no longer detected, the coefficients of, for example, the automatic equalizer immediately after the occurrence of the instantaneous dropout which are held in the modulation-demodulation section 11 can be used to restore operation of the modulation-demodulation section 11, thereby restarting data communication. Because there is not that much difference in the condition of the circuit before and after the instantaneous dropout, after the operation of the modulation-demodulation section 11 is restored, it is possible to quickly restart data communication based on the coefficients of, for example, the automatic equalizer which were set immediately prior to the occurrence of the instantaneous dropout, without having to perform training once again ((*e*) of FIG. 3).

In the case of this embodiment, although when an instantaneous dropout of 5 seconds or longer occurs there will always be a break in communication of 4 seconds, the timeout of a network system after which the system goes down is generally 7 to 15 seconds. In the case of this embodiment, because the operation of the modulation-demodulation section is restarted 4 seconds after the occurrence of an instantaneous dropout, even if an additional 1 second is required for restarting of operation, it is possible to restore the condition to the condition before the instantaneous dropout within a maximum of 5 seconds. Therefore, because the amount of time that the operation of the modulation-demodulation section is stopped is reliably shorter than the system timeout time, there is only a very small probability that the network will go down. For this reason, the overall time that communication is interrupted with the present invention is minimized. In addition, the above-noted elapsed time of 4 seconds corresponds to almost an integer multiple of the modulation timing of a V.29, 2400-baud modem, for example, this being a desirable amount of time, with regard to received data phase and frame synchronization when the operation of the modulation-demodulation section is restarted. FIG. 3(*f*) shows the case in the past in which retraining is performed, from which it can been seen that a time period of as much as 20 seconds is required to restart communication, thereby leading inevitably to the system going down.

Figure 4:
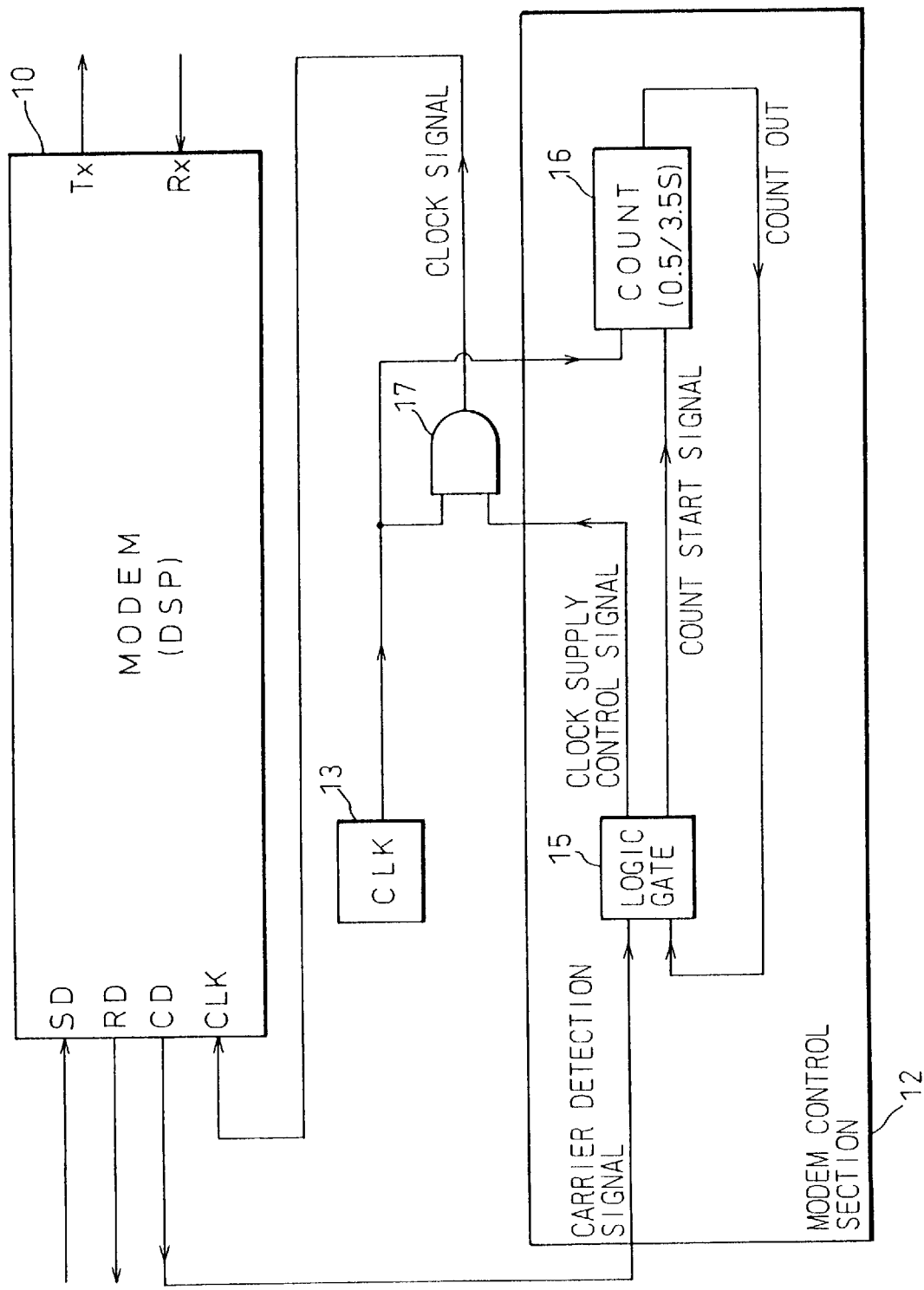
FIG. 4 is a drawing which shows the configuration of the modem control section of one embodiment of the present invention.

FIG. 4 shows an example of a specific configuration of the modem control section 12 and gate section 14 of FIG. 2.

In FIG. 4, the modem control section 12 of FIG. 2 is formed by a logic gate circuit 15 and a counter 16. The gate section 14 of FIG. 2 is formed by an AND gate circuit. The logic gate circuit 15 has supplied to it the carrier detection signal (CD) which is output from the modulation-demodulation section. During the period in which the carrier detection signal is output (on), the logic gate circuit 15 supplies the clock supply control signal (high level) to the AND gate circuit 17.

When the carrier detection signal is stopped (turned off), a count start signal to the counter 16 is output (turned on) from the logic gate circuit 15. The counter 16, based on count start signal from the gate circuit 15, performs counting of the clock signal being supplied from the clock source 13, thereby starting the clock. For a 0.5-second period after the stopping of the carrier detection signal, the count restart/stop is repeated in response to the on/off of the counter start signal, which corresponds to the carrier signal on/off. In the event that the stoppage (off condition) of the above-noted carrier detection signal continues for greater than 0.5 second, a count out signal is output to the logic gate 15 from the counter 16. By doing this, the count start signal is held in the on state, after which counting is forcibly performed for the remaining 3.5 seconds. Along with the above-noted count out signal being output to the logic gate circuit 15, the clock supply control signal applied to the AND gate 17 is stopped (changes to low level), which results in stopping the supply of the clock (CLK) to the modem 10.

The counter 16 turns off the count out signal to the logic gate circuit 15 at the point at which the above-noted 3.5 seconds has elapsed (after 4 seconds has elapsed since the cutoff of the carrier signal). The logic gate circuit 15 in response thereto outputs the clock supply control signal (high level) to the AND gate circuit 17 as the initial value at the time of instantaneous dropout recovery. By doing this, the clock signal is output from the AND gate circuit 17, and the operation of the modulation-demodulation section of the modem 10 is restarted. In addition, the holding of the above-noted count start signal at the logic gate circuit 15 is released, the above-described operation being repeated thereafter.

In the case in which the supply of the clock signal to the modulation-demodulation section is stopped, such as in the present invention, the carrier detection section also stops its detection of the carrier signal. For this reason, even if there is a recovery from an instantaneous dropout and the carrier signal is supplied to the modem from the communication circuit, it is not possible for the carrier detection section to detect the carrier signal, so that the it is not possible to restart the operation of the modulation-demodulation section.

For this reason, in the present invention, after a prescribed amount of time after the carrier signal stops (in this case, after 4 seconds), a clock supply control signal is output from the modem control section 12 to the gate section 14 of FIG. 1, so that the supply of the clock to the modulation-demodulation section is restarted. By doing this, the operation of the modulation-demodulation section is restored, enabling the carrier detection section to detect the presence or absence of a carrier signal. Should the instantaneous dropout have been recovered from, the carrier detection section will be able to detect the carrier signal and output a carrier detection signal to the modem control section 12, thereby restoring normal operation of the modem.

If, however, there has been no recovery from the instantaneous dropout when the operation of the modulation-demodulation section is restarted after the elapse of the prescribed amount of time, a carrier detection signal is not output to the modem control section 12. In such a case, after a prescribed amount of time (0.5 second) has elapsed after the restart of the output of the clock supply control signal from the modem control section 12, the supply of the clock to the modulation-demodulation section is stopped once again. In this case, because the cause of the carrier signal dropout is probably not an instantaneous dropout, it is possible to take the appropriate countermeasures.

FIG. 5 is a flowchart which shows an example of the processing procedure of the modem control section 12 of FIG. 2.

In FIG. 5, when data communication is started by the modem, the modem control section monitors the carrier detection signal which is output from the carrier detection section, and makes a judgment as to whether or not the carrier detection signal is on (step S1). If the carrier detection signal is on, detection of the carrier detection signal is continued.

If at step S1, however, the carrier detection signal is off, a judgment is made as to whether or not 0.5 second has elapsed since the carrier detection signal was turned off (step S1). In the case in which the off condition of the carrier detection signal has not continued for 0.5 second, monitoring of the time duration is continued. If 0.5 second has elapsed since the carrier detection signal was turned off, the modem control section sets the clock supply control signal to off (step S3) and outputs a count start instruction signal to the counter (step S4).

The counter starts to count the clock signal in response to the count start instruction signal (step S5). Then, a judgment is made as to whether or not 3.5 seconds have elapsed since the start of the counting by the counter (step S6). If 3.5 seconds have elapsed, the counter outputs a count out signal to the modem control section (step S7).

At the modem control section, the count out signal is received and the output of the clock supply control signal is restarted (step S8). By doing this, the supply of the clock to the modulation-demodulation section is restarted (step S9), resulting in the start of modulation-demodulation section operation.

Subsequent to the above operation, the modem control section and counter continue the processing shown in FIG. 5 until the data communication is completed and the circuit is disconnected.

In this example, the reason the above-noted counter counts only to 3.5 seconds is that it is also possible to use software counting or the like in the apparatus for the preceding 0.5 second. However, this is because with regard to the counting of the latter 3.5 seconds, because of the characteristics of the present invention that the apparatus clock (CLK) is caused to stop, an independently operating external counter is required. The time for restarting the operation of the modulation-demodulation section can be selected as a value other than 4 seconds, as is appropriate to the circuit to which the modem is connected or network conditions.

As described above, according to the present invention, it is possible to achieve quick recovery from an instantaneous dropout, without having to making major changes to the transmission apparatus such as a modem, particularly in the case of a modem having an LSI-implemented transmitting/receiving section. In particular, using a simple configuration in which the clock signal supplied to the transmitting/receiving section is stopped, it is possible to hold the conditions in the transmitting/receiving section to those in effect immediately prior to the occurrence of an instantaneous dropout, enabling the countermeasure means according to the present invention to be applied with a minimal addition of functions to existing transmission apparatus and without the need to made any change in the transmitting/receiving section.

Furthermore, according to the present invention even if it is not possible to detect the recovery from the instantaneous dropout by the transmitting/receiving section because the supply of the clock is stopped, it is possible to restart the supply of the clock signal to the transmitting/receiving section after the elapse of a prescribed amount of time after the occurrence of the instantaneous dropout, regardless of whether or not recovery from the instantaneous dropout has occurred. If the above-noted prescribed amount of time is set to correspond to the amount of time during which it is expected that recovery from the instantaneous dropout will occur, it is possible to restart the operation of the transmitting/receiving section at the point at which recovery from the instantaneous dropout occurs.

What is claimed:

1. A transmission apparatus having a modulator-demodulator, comprising:

means for receiving information via a communication circuit in said modulator-demodulator;

means for supplying an operating clock signal to said receiving means;

means for detecting whether an instantaneous dropout has occurred on said communication circuit, based on a carrier detection signal from said receiving means, and issuing an instantaneous dropout detection instruction when said carrier detection signal from said receiving means has continued for a first prescribed amount of time, said instantaneous dropout detection instruction being forcibly maintained for a second prescribed amount of time; and means for clock supply control for stopping supply of the operating clock to said receiving means in response to said instantaneous dropout detection instruction from said detection means for the second prescribed amount of time, so that the modulator-demodulator determines the instantaneous dropout occurred on said communication circuit as an instantaneous dropout that requires no training sequence, and restarting supply of an operating clock after the second prescribed amount of time has passed.

2. A transmission apparatus according to claim 1, wherein said instantaneous dropout detection means comprises a first counter circuit section which operates from a clock that is directly supplied thereto from said clock supplying means and which measures said prescribed amount of time based on said carrier detection signal from said receiving means, said clock supply control means comprising:

a gate circuit section which performs gating of said operating clock applied to said receiving means from said clock supplying means, a second counter circuit section which operates from a clock that is directly supplied thereto from said clock supplying means and which counts said prescribed amount of instantaneous dropout duration time based on said instantaneous dropout detection instruction from said instantaneous dropout detection means, and a logic circuit section which performs control to close said gate circuit section by means of said instantaneous dropout detection instruction from said instantaneous dropout detection means, opens said gate circuit by means of an output from said counter circuit, and also clears said first counter circuit section.

3. A method for control of a transmission apparatus which receives information via a communication circuit, comprising the steps of:

detecting the existence or non-existence of a carrier signal received via said communication circuit;

when said carrier signal has been interrupted for a first duration, judging that an instantaneous dropout has occurred, stopping supply of an apparatus clock to said transmission apparatus and holding receiving conditions in effect prior to the occurrence of said instantaneous dropout; and after elapse of said first duration, and at a point in time at which a second duration time which corresponds to a prescribed instantaneous dropout duration time has elapsed, restarting supply of said apparatus clock, said restarting of supply of said apparatus clock causing resumption of receiving under conditions existing at the time said instantaneous dropout occurred.

* * * * *